US011046122B2

United States Patent
Maehara

(10) Patent No.: US 11,046,122 B2
(45) Date of Patent: Jun. 29, 2021

(54) TIRE

(71) Applicant: Sumitomo Rubber Industries, Ltd., Kobe (JP)

(72) Inventor: Atsushi Maehara, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 295 days.

(21) Appl. No.: 15/789,734

(22) Filed: Oct. 20, 2017

(65) Prior Publication Data

US 2018/0134093 A1    May 17, 2018

(30) Foreign Application Priority Data

Nov. 11, 2016    (JP) .............................. JP2016-220892

(51) Int. Cl.
  *B60C 11/11*    (2006.01)
  *B60C 11/12*    (2006.01)
  *B60C 11/13*    (2006.01)
  *B60C 11/03*    (2006.01)

(52) U.S. Cl.
  CPC ...... *B60C 11/1218* (2013.01); *B60C 11/0306* (2013.01); *B60C 11/11* (2013.01); *B60C 11/12* (2013.01); *B60C 11/1236* (2013.01); *B60C 2011/0346* (2013.01); *B60C 2011/0353* (2013.01); *B60C 2011/0355* (2013.01);
  (Continued)

(58) Field of Classification Search
  CPC . B60C 11/0306; B60C 11/1236; B60C 11/12; B60C 11/1218; B60C 11/11; B60C 2011/1213; B60C 2011/0346
  See application file for complete search history.

(56) References Cited

U.S. PATENT DOCUMENTS

D686,145 S  *  7/2013  Godin .......................... D12/600
D735,646 S  *  8/2015  Hair, Jr. ....................... D12/594
(Continued)

FOREIGN PATENT DOCUMENTS

JP        03-136911 A  *  6/1991
JP        11-042911 A  *  2/1999
(Continued)

OTHER PUBLICATIONS

Machine translation for Japan 2002-321509 (Year: 2019).*
Machine translation for Japan 03-136911 (Year: 2019).*
Machine translation for Japan 11-042911 (Year: 2020).*

*Primary Examiner* — Steven D Maki

(74) *Attorney, Agent, or Firm* — Birch, Stewart, Kolasch & Birch, LLP

(57) ABSTRACT

A tire includes a tread portion provided with a plurality of blocks. At least one of the plurality of blocks is provided with a sipe. The sipe extends in a sipe longitudinal direction to form a zigzag opening configuration on a ground contact surface of the at least one of the plurality of blocks. The sipe extends inwardly in a tire radial direction such that the zigzag opening configuration oscillates in the sipe longitudinal direction repeatedly with a total amplitude and a wavelength while maintaining the zigzag opening configuration. A half of the wavelength of the sipe is in a range of from 0.10 to 0.24 times a maximum depth of the sipe, and a slope of the half of the wavelength with respect to the total amplitude has an angle in a range of from 45 to 65 degrees.

13 Claims, 5 Drawing Sheets

US 11,046,122 B2
Page 2

(52) U.S. Cl.
CPC ........... *B60C 2011/0367* (2013.01); *B60C 2011/1213* (2013.01); *B60C 2200/06* (2013.01)

(56) References Cited

U.S. PATENT DOCUMENTS

| | | | |
|---|---|---|---|
| 2003/0029537 A1* | 2/2003 | Iwamura | B60C 11/12 152/209.18 |
| 2005/0211354 A1 | 9/2005 | Shinmura et al. | |
| 2010/0096055 A1* | 4/2010 | Shibano | B60C 11/1369 152/209.25 |
| 2011/0083777 A1* | 4/2011 | Hidrot | B60C 11/12 152/209.17 |
| 2012/0006456 A1* | 1/2012 | Koshio | B60C 11/11 152/209.18 |
| 2014/0299245 A1* | 10/2014 | Kaji | B60C 11/1218 152/209.25 |
| 2016/0193883 A1* | 7/2016 | Kitani | B60C 11/0306 152/209.23 |

FOREIGN PATENT DOCUMENTS

| | | | |
|---|---|---|---|
| JP | 2002-321509 A | * | 11/2002 |
| JP | 2005-271792 A | | 10/2005 |

* cited by examiner

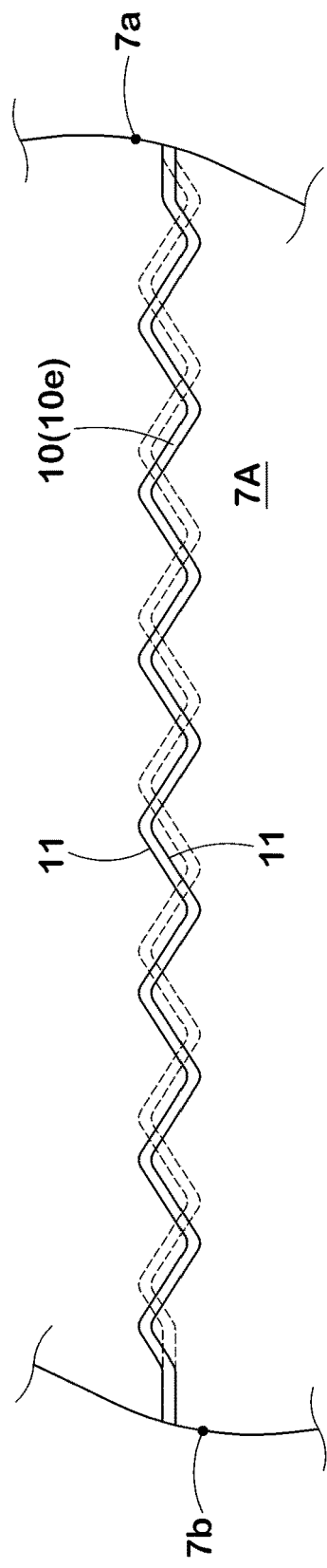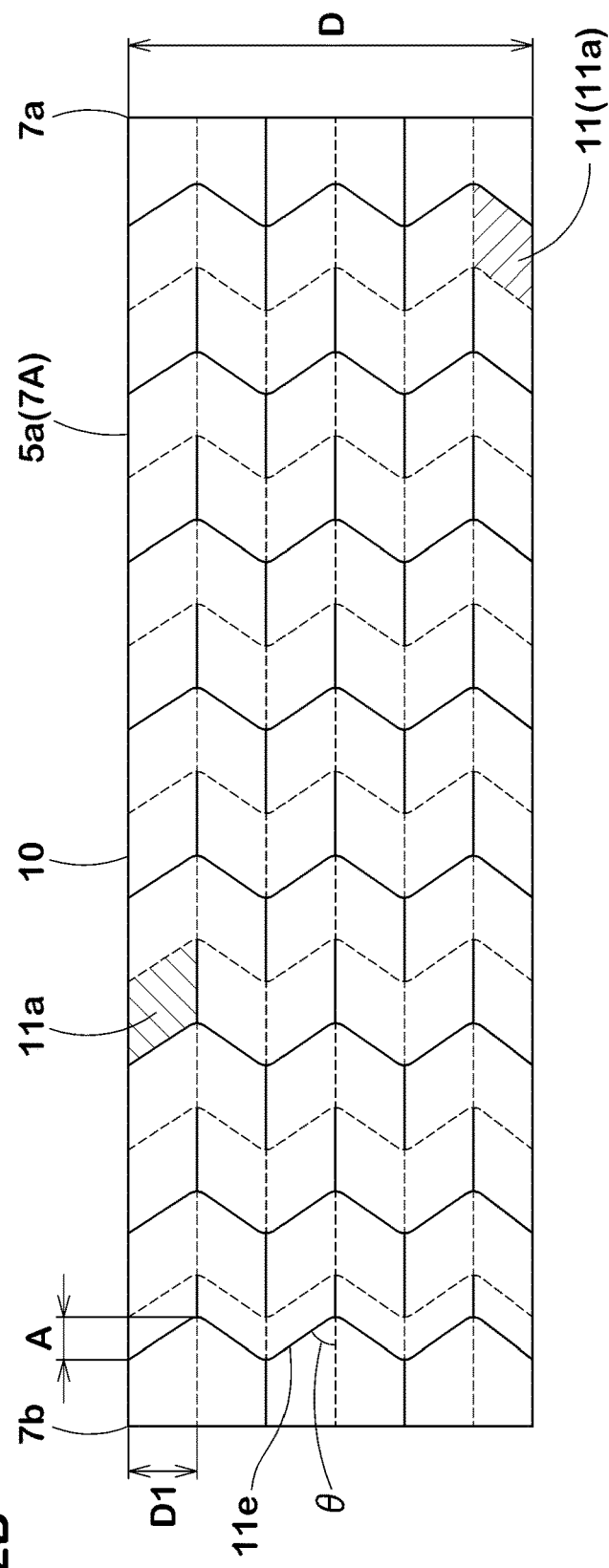

TIRE

BACKGROUND ART

Field of the Invention

The present invention relates to tires, and more particularly to a tire capable of improving tire life and wet performance.

Description of the Related Art

Tires, especially winter tires, which comprise a tread portion provided with a plurality of blocks with a narrow sipe have been proposed. In some aspects, the sipe extends in a sipe longitudinal direction to form a zigzag opening configuration on a ground contact surface of the blocks. Further, the sipe may extend inwardly in the tire radial direction such that the zigzag opening configuration oscillates in the sipe longitudinal direction repeatedly while maintaining the zigzag opening configuration. The sipe as mentioned above includes a pair of sipe walls facing each other wherein each of the sipe walls is configured as a wall having an unevenness surface varying in the tire radial direction as well as in the tire axial direction periodically. Since the pair of sipe walls may engage with each other when coming into contact with the ground, the apparent rigidity of the block can be enhanced to suppress the deformation of the block and volume reduction in grooves adjacent to the block.

Recently, customers require a longer life and better wet performance for tires than ever.

SUMMARY OF THE INVENTION

The present invention has been made in view of the above circumstances, and has an object to provide tires capable of improving tire life and wet performance.

In one aspect of the invention, a tire includes a tread portion provided with a plurality of blocks. At least one of the plurality of blocks is provided with a sipe. The sipe extends in a sipe longitudinal direction to form a zigzag opening configuration on a ground contact surface of the at least one of the plurality of blocks. The sipe extends inwardly in a tire radial direction such that the zigzag opening configuration oscillates in the sipe longitudinal direction repeatedly with a total amplitude and a wavelength while maintaining the zigzag opening configuration, wherein a half of the wavelength is in a range of from 0.10 to 0.24 times a maximum depth of the sipe, and wherein a slope of the half of the wavelength with respect to the total amplitude has an angle in a range of from 45 to 65 degrees.

In another aspect of the invention, the sipe may be provided such that the sipe longitudinal direction is in a range of from 5 to 15 degrees with respect to a tire axial direction.

In another aspect of the invention, the ground contact surface of the at least one of the plurality of blocks may comprise a pair of peak portions protruding outwardly on both sides in a tire axial direction, and the sipe may comprise a first end and a second end each of which is located proximately to either one of the pair of peak portions.

In another aspect of the invention, the pair of peak portions may comprise a first peak portion and a second peak portion, and the ground contact surface of the at least one of the plurality of blocks may comprise a first long edge extending from the first peak portion toward a first side in a tire circumferential direction, a first short edge extending from the first peak portion toward a second side in the tire circumferential direction, a second long edge extending from the second peak portion toward the first side in the tire circumferential direction, and a second short edge extending from the second peak portion toward the second side in the tire circumferential direction.

In another aspect of the invention, the first end of the sipe may be in communication with the first peak portion or may be located within 2 mm in the tire circumferential direction from the first peak portion, and the second end of the sipe may be in communication with the second long edge at a location which is away from the second peak portion greater than 2 mm but within 5 mm in the tire circumferential direction.

In another aspect of the invention, the plurality of blocks may be arranged in the tire circumferential direction with pitches through lateral grooves, and the lateral grooves may have widths in a range of from 15% to 25% of the pitches.

In another aspect of the invention, the plurality of blocks may have a maximum width in a tire axial direction in a range of from 15% to 25% of a tread width.

BRIEF DESCRIPTION OF THE DRAWINGS

FIG. 2A is a plan view of a sipe provided on a crown block, and FIG. 2B is a front view of a sipe wall of the sipe illustrated in FIG. 2A.

DESCRIPTION OF THE PREFERRED EMBODIMENTS

An embodiment of the present invention will be explained below with reference to the accompanying drawings.

Figure 1:
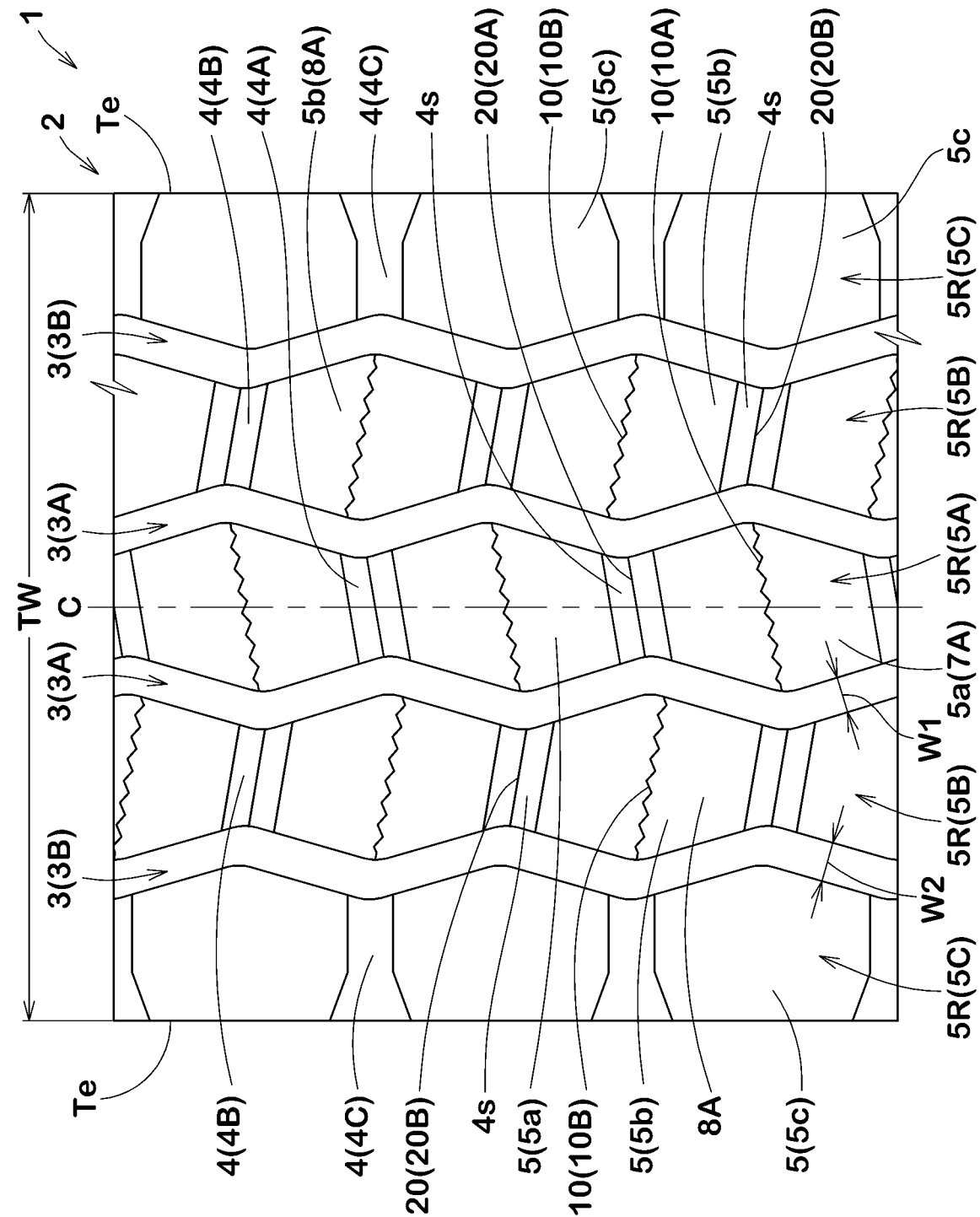
FIG. 1 is a development view of a tread portion according to one embodiment of the present invention.

FIG. 1 illustrates a development view of a tread portion 2 of a tire 1 according to one embodiment of the present invention. The present invention may be embodied as a various kind of tires, e.g., pneumatic tires for passenger car or motorcycle, and non-pneumatic tires which can support the tire load structurally without being filled with a pressurized air. The tire 1 illustrated in FIG. 1 is embodied for a heavy load vehicle.

The tread portion 2, in the embodiment, is provided with a plurality of main grooves 3 extending continuously in the tire circumferential direction and a plurality of lateral grooves 4 extending between the main grooves 3 or extending between one of the main grooves 3 and a tread edge Te which is adjacent to the one of the main grooves 3. Thus, the tread portion 2 is configured to have a plurality of brock rows 5R each of which includes a plurality of circumferentially spaced blocks 5 each divided by the main grooves 3 and the lateral grooves 4.

The main grooves 3 in accordance with the embodiment include a pair of crown main grooves 3A and 3A arranged such that the tire equator C is located therebetween and a pair of shoulder main grooves 3B and 3B arranged outside the crown main grooves 3A in the tire axial direction. In some embodiments, the main grooves 3 may extend in a zigzag manner. Note that the main grooves 3 are not limited to such an aspect, but can be embodied as various aspects.

In some embodiments, although it is not particularly limited, the respective groove widths W1 and W2 of the crown main grooves 3A and the shoulder main grooves 3B are preferably in a range of from 2% to 6% of the tread width TW. The depths of the crown main grooves 3A and the shoulder main grooves 3B (not illustrated) are preferably in a range of from 10 to 20 mm, for example.

The lateral grooves 4 in accordance with the embodiment include crown lateral grooves 4A, middle lateral grooves 4B and shoulder lateral grooves 4C. The crown lateral grooves 4A extend to communicate with the pair of crown main grooves 3A and 3A from each other. The middle lateral grooves 4B extend to communicate the crown main grooves 3A with the shoulder main grooves 3B. The shoulder lateral grooves 4C extend from the shoulder main grooves 3B to the tread edges Te. In some embodiments, although the lateral grooves 4 may extend in a straight manner, it is noted that the lateral grooves 4 are not limited to such an aspect.

In some preferred embodiments, the depths (not illustrated) of the crown lateral grooves 4A and the middle lateral grooves 4B may be set in a range of from 60% to 90% of the depths of the crown main grooves 3A. In some preferred embodiments, the depths (not illustrated) of the shoulder lateral grooves 4C may be set in a range of from 10% to 40% of the depths of the shoulder main grooves 3B.

As used herein, the tread edges Te refer to axially outermost edges of the ground contacting patch of the tread portion 2 which occurs under a condition where the tire being under a standard condition is grounded on a plane with a standard tire load at the camber angle of zero.

As used herein, the standard condition is such that the tire is mounted on a standard wheel rim (not illustrated) with a standard pressure, but is loaded with no tire load. In this application including specification and claims, various dimensions, positions and the like of the tire refer to those under the standard condition of the tire unless otherwise noted.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved for the tire by standards organizations, wherein the standard tire load is the "maximum load capacity" in JATMA, the "Load Capacity" in ETRTO, and the maximum value given in the above-mentioned table in TRA or the like.

In this embodiment, the block rows 5R include a crown block row 5A, a pair of middle block rows 5B and a pair of shoulder block rows 5C. The crown block row 5A, in the embodiment, is provided on the tire equator C and includes a plurality of crown blocks 5a divided by the pair of crown main grooves 3A and the crown lateral grooves 4A. The middle block rows 5B, in the embodiment, include a plurality of middle blocks 5b divided by the crown main grooves 3A, the shoulder main grooves 3B and the middle lateral grooves 4B. The shoulder block rows 5C, in the embodiment, include a plurality of shoulder blocks 5c divided by the shoulder main grooves 3B, the tread edges Te and the shoulder lateral grooves 4C.

In the embodiment, at least one of the crown blocks 5a, the middle blocks 5b and the shoulder blocks 5c is provided with a sipe 10. In some preferred embodiments, the sipe 10 may be formed on the crown blocks 5a and the middle blocks 5b as a crown sipe 10A and a middle sipe 10B respectively. The sipe 10 extends in a sipe longitudinal direction to form a zigzag opening configuration 10e, as illustrated in FIG. 2, on ground contact surfaces 7A and 8A of the of the crown blocks 5a and the middle blocks 5b respectively. As used herein, a sipe refers to as a narrow cut that has a width equal to or less than 2.0 mm.

Figure 3:
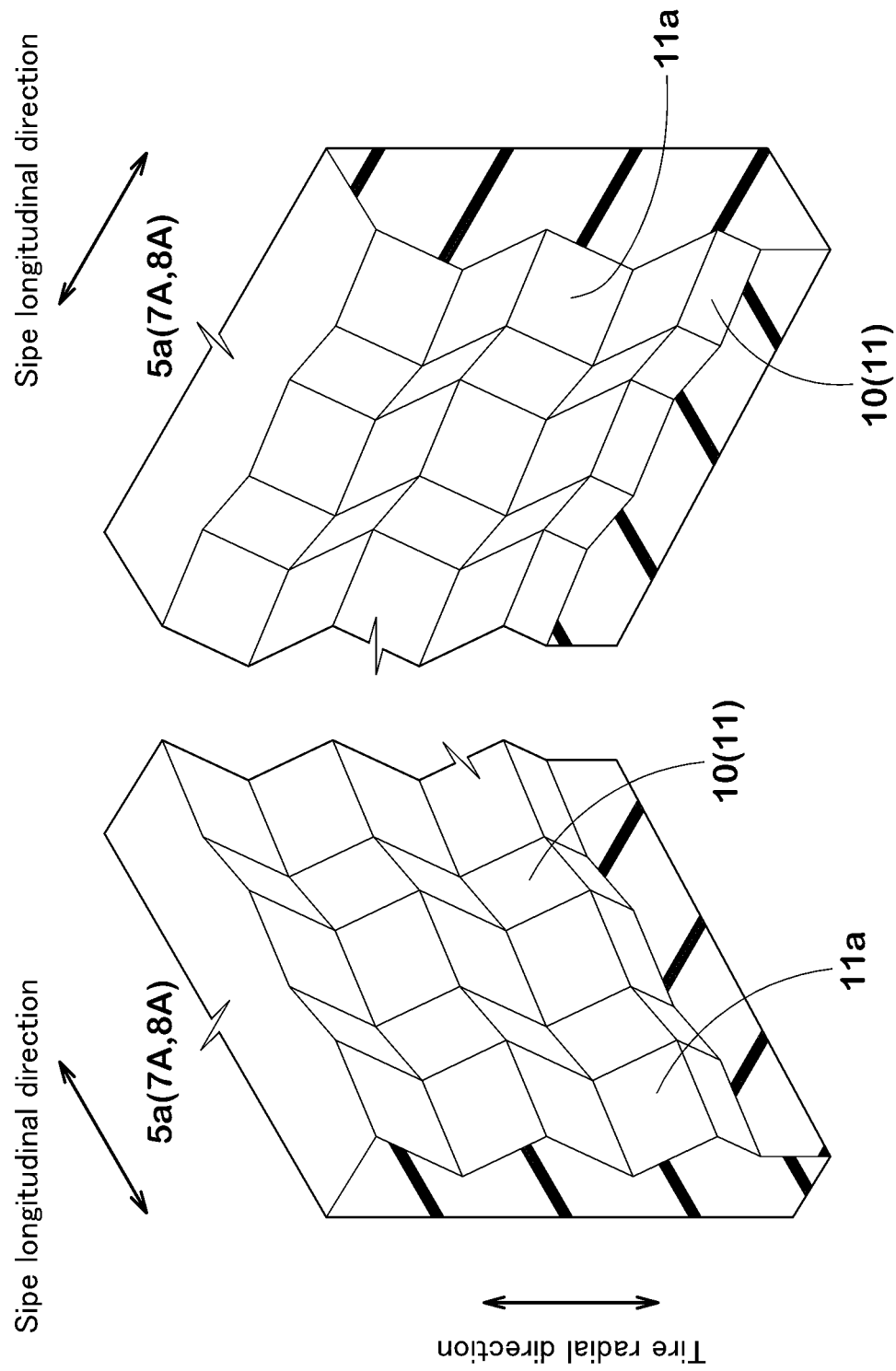
FIG. 3 is a perspective development view of a part of a crown block which is divided by the sipe.

FIG. 2A illustrates a plan view of the sipe 10 (the crown sipe 10A), and FIG. 2B illustrates a front view of one of sipe walls 11. FIG. 3 illustrates a perspective development view of a part of the crown block 5a which is divided by the sipe 10. As illustrated in FIGS. 2A, 2B and 3, the sipes 10, in the embodiment, extends inwardly in a tire radial direction such that the zigzag opening configuration 10e oscillates in the sipe longitudinal direction repeatedly with a total amplitude (A) and a wavelength while maintaining the shape of the zigzag opening configuration 10e. The sipe 10 as mentioned above includes a pair of sipe walls 11 and 11 facing each other wherein each of the sipe walls 11 is configured as a wall having an unevenness surface varying in the tire radial direction as well as in the tire axial direction periodically. Since the pair of sipe walls 11 may engage with each other when coming into contact with the ground, the apparent rigidity of the blocks 5a and 5b can be enhanced to suppress the deformation of the blocks 5a and 5b and volume reduction in the lateral grooves 4A and 4B adjacent to the blocks 5a and 5b. Thus, the tire life and wet performance of the tire may be improved. Since the sipe 10 may enhance the apparent rigidity of the block 5, the sipe 10 may preferably be used for heavy duty tires which are supposed to receive a large ground contact pressure.

The inventor has found that a tire life and wet performance of the tire can be further improved by modifying the configuration of the sipe 10 as follows. First, in the sipe 10, a half of the wavelength (hereinafter, the half wavelength D1) is set in a range of from 0.10 to 0.24 times a maximum depth D of the sipe 10. Second, a slope of the half wavelength D1 with respect to the total amplitude (A) is set to have an angle θ in a range of from 45 to 65 degrees. When the half wavelength D1 is less than 0.10 times the maximum depth D of the sipe 10, some of the blocks 5a and 5b may chip due to difficulty of pulling out knife-blades for molding sipe (not illustrated) from the tire smoothly after vulcanization. When the half wavelength D1 is greater than 0.24 time the maximum depth D of the sipe 10, the effect that suppresses deformation of the blocks 5a and 5b when coming into contact with the ground may be deteriorated since an engagement force between the sipe walls 11 becomes lower. Furthermore, the slope angle θ of the half wavelength D1 is less than 45 degrees, some of the blocks 5a and 5b may chip when the knife-blades are pulled out. When the slope angle θ of the half wavelength D1 is greater than 65 degrees, the effect that suppresses deformation of the blocks 5a and 5b when coming into contact with the ground may be deteriorated since an engagement force between the sipe walls 11 becomes lower.

The sipe walls 11, in the embodiment, are configured to have a plurality of substantially parallelogram wall-pieces 11a are arranged in the tire radial direction and the sipe longitudinal direction. In FIG. 2B, some wall-pieces 11a are hatched. The above-mentioned slope angle θ refers to as an angle of a radially extending longitudinal edge 11e of each wall-piece 11 with respect to the sipe longitudinal direction. The above-mentioned half wavelength D1 refers to as a radial length of the longitudinal edge 11e of each wall-piece 11. In FIG. 2B, broken lines and solid lines of the wall-pieces 11a show mountain fold portions and valley fold portions respectively.

Figure 4:
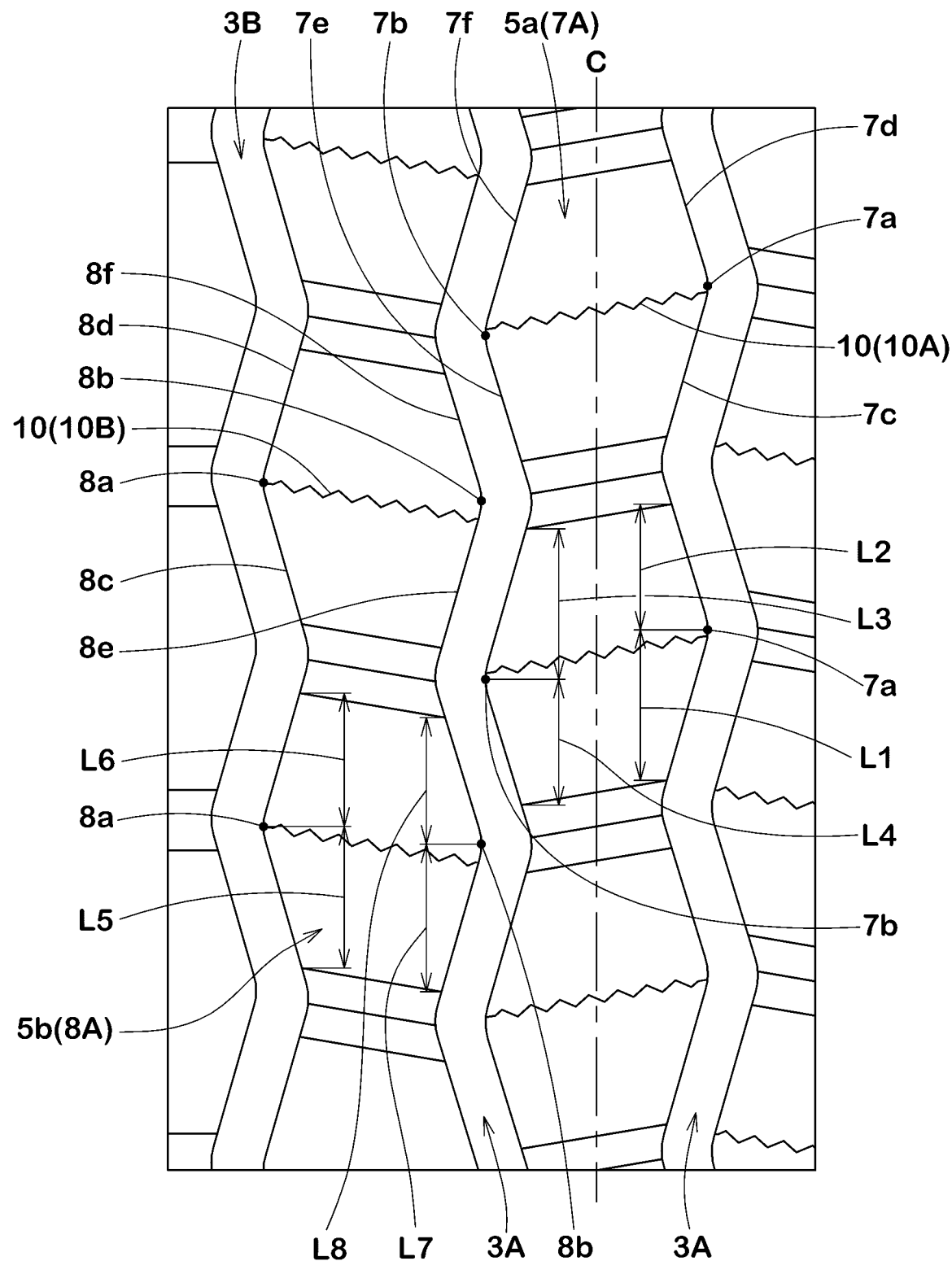
FIGS. 4 and 5 are enlarged views of a crown block row and a middle block row.

As illustrated in FIG. 4, the ground contact surface 7A of each of the crown blocks 5a includes a pair of peak portions protruding outwardly on both sides in the tire axial direction, wherein the pair of peak portions include a first peak portion 7a protruding toward one side in the tire axial direction (the right side in FIG. 4) and a second peak portion 7b protruding toward the other side in the tire axial direction (the left side in FIG. 4).

The ground contact surface 7A of each of the crown blocks 5a, in the embodiment, includes a first long edge 7c extending from the first peak portion 7a toward a first side in the tire circumferential direction (below in FIG. 4) and a first short edge 7d extending from the first peak portion 7a toward a second side in the tire circumferential direction (above in FIG. 4). Furthermore, the ground contact surface 7A of each of the crown blocks 5a, in the embodiment, includes a second short edge 7e extending from the second peak portion 7b toward the first side in the tire circumferential direction and a second long edge 7f extending from the second peak portion 7b toward the second side in the tire circumferential direction. As mentioned above, the crown blocks 5a includes circumferentially extending block edges which include the first long edge 7c, the second long edge 7f, the first short edge 7d and the second short edge 7e.

The first long edge 7c is inclined in an opposite direction to the first short edge 7d with respect to the tire circumferential direction. Similarly, the second short edge 7e is inclined in an opposite direction to the second long edge 7f with respect to the tire circumferential direction.

The ground contact surface 8A of each of the middle blocks 5b includes a pair of peak portions protruding outwardly on both sides in the tire axial direction, wherein the pair of peak portions include a first peak portion 8a protruding outwardly in the tire axial direction and a second peak portion 8b protruding toward the tire equator C.

The ground contact surface 8A of each of the middle blocks 5b, in the embodiment, includes a first long edge 8c extending from the first peak portion 8a toward the first side in the tire circumferential direction and a first short edge 8d extending from the first peak portion 8a toward the second side in the tire circumferential direction. Furthermore, the ground contact surface 8A of each of the middle blocks 5b, in the embodiment, includes a second long edge 8e extending from the second peak portion 8b toward the first side in the tire circumferential direction and a second short edge 8f extending from the second peak portion 8b toward the second side in the tire circumferential direction. As mentioned above, the middle blocks 5b includes circumferentially extending block edges which include the first long edge 8c, the second long edge 8e, the first short edge 8d, and the second short edge 8f.

In each of the middle blocks 5b, the first long edge 8c is inclined in an opposite direction to the first short edge 8d with respect to the tire circumferential direction. Similarly, in each of the middle blocks 5b, the second long edge 8e is inclined in an opposite direction to the second short edge 8f with respect to the tire circumferential direction.

In some preferred embodiment, as mentioned above, the crown blocks 5a as well as the middle blocks 5b are configured to have a substantially barrel typed hexagonal shape. Since each of the blocks 5a and 5b as such suppresses deformation of blocks, the life and wet performance of the tire may be improved.

Figure 5:
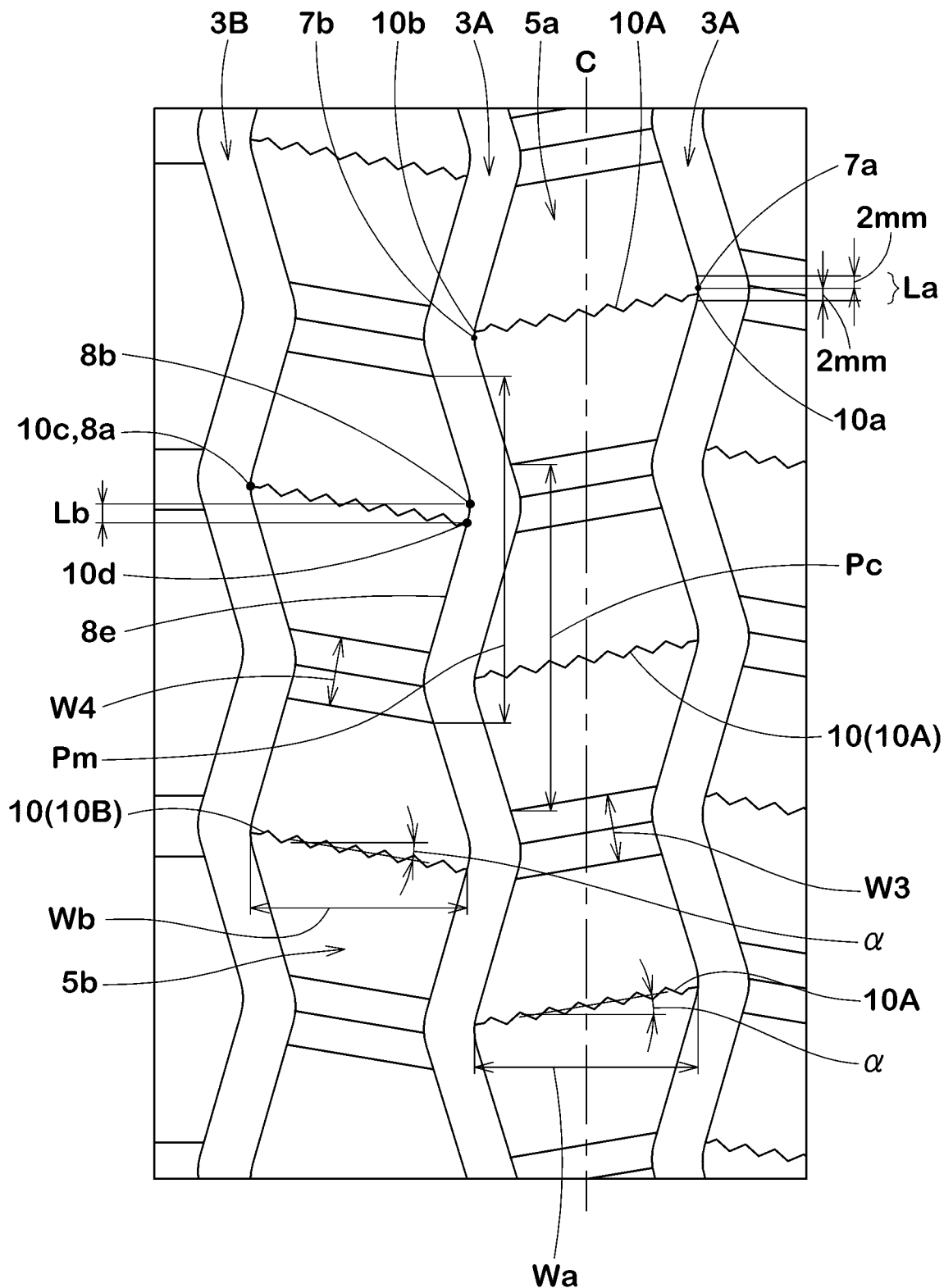

As illustrated in FIG. 5, each of the crown sipes 10A includes a first end 10a and a second end 10b which are respectively located on or proximately to the peak portions 7a and 7b of the crown blocks 5a. Thus, the length of each of the crown sipes 10A may become longer to increase the number of wall-pieces 11a of the sipe 10A such that a large engagement force is generated between sipe walls 11. Accordingly, the deformation of the crown blocks 5a may be suppressed to improve wet performance as well as tire life. Further, knife-blades for molding the crown sipes 10A may be pulled out easily from the tire since the crown blocks 5a have unbalanced circumferential rigidity on both sides of the respective peak portions 7a and 7b. Thus, chipping damages on the crown blocks 5a may be suppressed to exhibit better tire life.

In the crown blocks 5a in accordance with the embodiment, each of the crown sipes 10A has the first end 10a and the second end 10b which are respectively located within a circumferential distance La of 2 mm from the first peak portion 7a and the second peak portion 7b in the tire circumferential direction. Furthermore, in some preferred embodiments, in each of the crown sipes 10A, the first end 10a may be in communication with the first peak portion 7a, and/or the second end 10b may be in communication with the second peak 7b in order to further improve the above advantageous effects.

Each of the middle sipes 10B includes a first end 10c and a second end 10d which are respectively located on or proximately to the first peak portion 8a and the second peak portion 8b. Thus, the length of each of the middle sipes 10B may become longer to increase the number of wall-pieces 11a of the sipe 10B such that a large engagement force is generated between sipe walls 11. Accordingly, the deformation of the middle blocks 5b may be suppressed to improve wet performance as well as tire life. Further, knife-blades for molding the middle sipes 10B may be pulled out easily from the tire since the middle blocks 5b have unbalanced circumferential rigidity on both sides of the respective peak portions 8a and 8b. Thus, chipping damages on the middle blocks 5b may be suppressed to exhibit better tire life.

In some preferred embodiments, in each of the middle blocks 5b, the first end 10c of the middle sipe 10B is in communication with the first peak portion 8a or is located within 2 mm in the tire circumferential direction from the first peak portion 8a. Further, in some preferred embodiments, in each of the middle blocks 5b, the second end 10d of the middle sipe 10B is in communication with the second long edge 8e, wherein a circumferential distance Lb between the second end 10d of the middle sipe 10B and the second peak portion 8b is preferably greater than 2 mm but equal to or less than 5 mm. Since the second peak portion 8b may receive a larger ground contact pressure than the first peak portion 8a, it is a portion where chipping damages, wear and the like tend to occur thereon. Thus, by connecting the second end 10d with the second long edge 8e, the chipping damages and the like can be suppressed, thereby maintaining long tire life.

As illustrated in FIG. 4, in each of the crown blocks 5a, when a ratio L1/L2 between a circumferential length L1 of the first long edge 7c and a circumferential length L2 of the first short edge 7d becomes larger, the difference in rigidity of the crown block 5a between circumferential both sides of the first peak portion tends to be excessively large. That is, the rigidity on the side of the first short edge 7d of the crown block 5a tends to be excessively small, and may make the tire life deteriorate. Thus, the ratio L1/L2 of each of the crown blocks 5a is preferably in a range of from 1.05 to 1.15. In the same point of view, in each of the crown blocks 5a, a ratio L3/L4 between a circumferential length L3 of the second long edge 7f and a circumferential length L4 of the second short edge 7e is preferably in a range of from 1.05 to 1.15. Further, in each of the middle blocks 5b, a ratio L5/L6 between a circumferential length L5 of the first long edge 8c and a circumferential length L6 of the first short edge 8d is preferably in a range of from 1.05 to 1.15. Furthermore, in each of the middle blocks 5b, a ratio L7/L8 between a circumferential length L7 of the second long edge 8e and a circumferential length L8 of the second short edge 8f is preferably in a range of from 1.05 to 1.15.

As illustrated in FIG. 5, in some preferred embodiment, each of the sipes 10 is provided such that the sipe longitudinal direction has an angle α in a range of from 5 to 15 degrees with respect to the tire axial direction. Thus, wet performance and life of the tire can be improved since the sipe walls 11 engage firmly with each other when straight traveling ahead as well as cornering. When the angle α of the sipes 10 is less than 5 degrees, engagement force of the sipe walls 11 when cornering tends to be small. On the other hand, when the angle α of the sipes 10 is greater than 15 degrees, engagement force of the sipe walls 11 when straight traveling ahead.

Preferably, the crown blocks 5a have maximum widths Wa in the tire axial direction in a range of from 15% to 25% of the tread width TW. When the maximum widths Wa of the crown blocks 5a are less than 15% of the tread width TW, the tire life tends to be worse since the rigidity of the crown blocks 5 becomes small. When the maximum widths Wa of the crown blocks 5a are greater than 25% of the tread width TW, uneven wear may appear on the middle blocks 5b or the shoulder blocks 5c since the rigidity of these blocks 5b and 5c become small. Typically, when the tire 1 is used as a driving wheel, the middle blocks 5b are supposed to receive a smaller ground contact pressure than the crown blocks 5a. Thus, the maximum widths Wb of the middle blocks 5b are preferably equal to or less than the maximum widths Wa of the crown blocks 5a. In some preferred embodiments, the maximum widths Wb of the middle blocks 5b in the tire axial direction are in a range of from 15% to 25% of the tread width TW.

Preferably, the widths W3 of the crown lateral grooves 4A are in a range of from 15% to 25% of the pitches Pc of the crown blocks 5a. When the widths W3 of the crown lateral grooves 4A are less than 15% of the pitches of the crown blocks 5, wet performance of the tire may be worse since the volume of the crown lateral grooves 4A becomes small. When the widths W3 of the crown lateral grooves 4A are greater than 25% of the pitches Pc of the crown blocks 5, the tire life may be worse since the rigidity of the crown blocks 5a becomes small.

As mentioned above, when the tire 1 is used as a driving wheel, the middle blocks 5b are supposed to receive a smaller ground contact pressure than the crown blocks 5a. Thus, the tire life can be maintained even if the middle blocks 5b are configured to have smaller rigidity than the crown blocks 5a while improving wet performance by enlarging the widths W4 of the middle lateral grooves 4B. From such a point of view, the widths W4 of the middle lateral grooves 4B are preferably in a range of from 16% to 26% of the pitches Pm of the middle blocks 5b.

The middle lateral grooves 4B are in communication with the crown main grooves 3A at locations of the first peak portion 7a and the second peak portions 7b of the crown blocks 7. Thus, the water in the crown main grooves 3A may flow smoothly to the middle lateral grooves 4B to improve wet performance.

The middle lateral grooves 4B are inclined in an opposite direction to the crown lateral grooves 4A with respect to the tire axial direction, i.e., the middle lateral grooves 4B are inclined in the upward left direction, and the crown lateral grooves 4A are inclined in the upward right direction. Thus, using a tire rotation, the water in the crown main grooves 3A and the shoulder main grooves 3B may be discharged axially outside to improve wet performance.

As illustrated in FIG. 1, each of the middle lateral grooves 4B arranged on one side of the tire equator C are arranged in different positions in the tire circumferential direction with respect to each of the middle lateral grooves 4B arranged on the other side of the tire equator C. Thus, each of the middle blocks 5b arranged on the one side of the tire equator C are also arranged in different positions in the tire circumferential direction with respect to each of the middle blocks 5b arranged on the other side of the tire equator C. Thus, the middle blocks 5b and 5b which are arranged on both sides of the tire equator C do not come into contact with the ground at the same time, but coming into contact with the ground at different timing. This makes it possible to reduce the ground contact pressure acting on each of the middle blocks 5b, thereby maintain a long tire life.

The shoulder blocks 5c in accordance with the embodiment are not provided with any sipes in contrast to the crown blocks 5a and the middle blocks 5b. When the sipes 10 are provided on the shoulder blocks 5c, which are located near the tread edge Te, uneven wear tends to appear easily thereon as compared with the crown blocks 5a and the middle blocks 5b.

In the embodiment, in some of the lateral grooves 4, the bottoms 4s are provided with groove-bottom sipes 20. The groove-bottom sipes 20, in the embodiment, include first groove-bottom sipes 20A provided on the crown lateral grooves 4A and second groove-bottom sipes 20B provided on the middle lateral grooves 4B. The groove-bottom sipes 20 as such may open so as to increase groove volume of the lateral grooves 4 to improve wet performance when the blocks 5 which are adjacent to the groove-bottom sipes come into contact with the ground.

The groove-bottom sipes 20, in the embodiment, extend in a straight manner in the tire radial direction as well as the sipe longitudinal direction. In some preferred embodiments, the first groove-bottom sipes 20A and the second groove-bottom sipes 20B may respectively extend in substantially parallel with the crown sipes 10A and the middle sipes 10B. Such groove-bottom sipes 20 may further improve the above advantageous effects. As used herein, the above "substantially parallel" means that the groove-bottom sipes 20 and the sipes 10 are inclined in the same direction with respect to the tire axial direction and the difference between the angles of these sipe longitudinal directions with respect to the tire axial direction is equal to or less than 5 degrees.

While the particularly preferable embodiments in accordance with the present invention have been described in detail, the present invention is not limited to the illustrated embodiments, but can be modified and carried out in various aspects.

EXAMPLE

Heavy duty pneumatic tires, 275/80R22.5, having the basic tread pattern as illustrated in FIG. 1 were manufactured based on the details as shown in Table 1. Then, wet performance and tire life were tested. The test methods are as follows. Note that the sipes were formed using knife-blades during vulcanization process. Further, the number of wall-pieces in the tire radial direction of each tire was specified in accordance with the half wavelength.

Common Specifications:
Sipe maximum depth D: 15.1 mm
Wet Performance Test:

Each of the test tires mounted on a rim 7.50×22.5 with an internal pressure of 900 kPa was installed to a truck (2-D Type) having load of 10 ton as its all wheels, and then a driver evaluated the steering response, rigidity and grip when driving the truck on an asphalt test road covered with a 1 mm deep water. The test results are shown in Table 1 using a score wherein the Ex. 2 is set to 100. The larger the score, the better the wet performance is.

Tire Life Test:

After the test driver had driven the above truck on a dry asphalt road for 1,000 km, an amount of wear of the tread was measured. The results are indicated in Table 1 using an index of reciprocals of the measurements, wherein Ex. 2 is set to 100. The larger the index, the better the tire life is.

Table 1 shows the test results.

TABLE 1

|  | Ref. 1 | Ex. 1 | Ex. 2 | Ex. 3 | Ref. 2 | Ref. 3 | Ex. 4 | Ex. 5 | Ref. 4 | Ex. 6 |
|---|---|---|---|---|---|---|---|---|---|---|
| Ratio D1/D of half wavelength D1 to sipe maximum depth D | 0.08 | 0.1 | 0.17 | 0.24 | 0.26 | 0.17 | 0.17 | 0.17 | 0.17 | 0.17 |
| Slope angle θ of half wavelength (deg.) | 55 | 55 | 55 | 55 | 55 | 40 | 45 | 65 | 70 | 55 |
| Crown sipe longitudinal angle α (deg.) | 10 | 10 | 10 | 10 | 10 | 10 | 10 | 10 | 10 | 3 |
| Circumferential length La between first end of crown sipe and first peak portion (mm) | 1 | 1 | 1 | 1 | 1 | 1 | 1 | 1 | 1 | 1 |
| Circumferential length Lb between second end of middle sipe and second peak portion (mm) | 3 | 3 | 3 | 3 | 3 | 3 | 3 | 3 | 3 | 3 |
| Ratio W3/Pc of crown lateral groove widths W3 to crown block pitches Pc (%) | 20 | 20 | 20 | 20 | 20 | 20 | 20 | 20 | 20 | 20 |
| Ratio W4/Pm of middle lateral groove widths W4 to middle block pitches Pm (%) | 20 | 20 | 20 | 20 | 20 | 20 | 20 | 20 | 20 | 20 |
| Ratio Wa/TW of crown block maximum width Wa to tread width TW (%) | 20 | 20 | 20 | 20 | 20 | 20 | 20 | 20 | 20 | 20 |
| Wet performance [score] | 97 | 100 | 100 | 98 | 93 | 97 | 99 | 98 | 96 | 98 |
| Tire life [index] | 94 | 98 | 100 | 100 | 98 | 93 | 98 | 98 | 94 | 98 |

|  | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| Ratio D1/D of half wavelength D1 to sipe maximum depth D | 0.17 | 0.17 | 0.17 | 0.17 | 0.17 | 0.17 | 0.17 | 0.17 | 0.17 | 0.17 |
| Slope angle θ of half wavelength (deg.) | 55 | 55 | 55 | 55 | 55 | 55 | 55 | 55 | 55 | 55 |
| Crown sipe longitudinal angle α (deg.) | 5 | 15 | 20 | 10 | 10 | 10 | 10 | 10 | 3 | 5 |
| Circumferential length La between first end of crown sipe and first peak portion (mm) | 1 | 1 | 1 | 2 | 3 | 1 | 1 | 1 | 1 | 1 |
| Circumferential length Lb between second end of middle sipe and second peak portion (mm) | 3 | 3 | 3 | 3 | 3 | 1 | 5 | 7 | 3 | 3 |
| Ratio W3/Pc of crown lateral groove widths W3 to crown block pitches Pc (%) | 20 | 20 | 20 | 20 | 20 | 20 | 20 | 20 | 13 | 15 |
| Ratio W4/Pm of middle lateral groove widths W4 to middle block pitches Pm (%) | 20 | 20 | 20 | 20 | 20 | 20 | 20 | 20 | 20 | 20 |
| Ratio Wa/TW of crown block maximum width Wa to tread width TW (%) | 20 | 20 | 20 | 20 | 20 | 20 | 20 | 20 | 20 | 20 |
| Wet performance [score] | 100 | 98 | 98 | 100 | 96 | 100 | 100 | 97 | 97 | 98 |
| Tire life [index] | 98 | 100 | 98 | 98 | 101 | 98 | 100 | 101 | 100 | 100 |

|  | Ex. 17 | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|---|
| Ratio D1/D of half wavelength D1 to sipe maximum depth D | 0.17 | 0.17 | 0.17 | 0.17 | 0.17 | 0.17 | 0.17 | 0.17 | 0.17 | 0.17 |
| Slope angle θ of half wavelength (deg.) | 55 | 55 | 55 | 55 | 55 | 55 | 55 | 55 | 55 | 55 |
| Crown sipe longitudinal angle α (deg.) | 15 | 20 | 10 | 10 | 10 | 10 | 10 | 10 | 10 | 10 |
| Circumferential length La between first end of crown sipe and first peak portion (mm) | 1 | 1 | 1 | 1 | 1 | 1 | 1 | 1 | 1 | 1 |
| Circumferential length Lb between second end of middle sipe and second peak portion (mm) | 3 | 3 | 3 | 3 | 3 | 3 | 3 | 3 | 3 | 3 |
| Ratio W3/Pc of crown lateral groove widths W3 to crown block pitches Pc (%) | 25 | 27 | 20 | 20 | 20 | 20 | 20 | 20 | 20 | 20 |
| Ratio W4/Pm of middle lateral groove widths W4 to middle block pitches Pm (%) | 20 | 20 | 14 | 21 | 26 | 28 | 20 | 20 | 20 | 20 |
| Ratio Wa/TW of crown block maximum width Wa to tread width TW (%) | 20 | 20 | 20 | 20 | 20 | 20 | 13 | 15 | 25 | 27 |
| Wet performance [score] | 101 | 101 | 96 | 97 | 100 | 100 | 101 | 100 | 100 | 97 |
| Tire life [index] | 97 | 96 | 101 | 101 | 98 | 97 | 97 | 100 | 100 | 101 |

As apparent from the test results as shown in Table 1, it was confirmed that the example pneumatic tires had improved the wet performance and the tire life significantly as compared with the reference example tire.

What is claimed is:

1. A heavy-duty tire comprising:
a tread portion being provided with four main grooves and a plurality of lateral grooves to define five block rows consisting of a crown block row arranged on a tire equator, a pair of middle block rows arranged axially outwardly of the crown block row, and a pair of shoulder block rows arranged axially outwardly of the pair of middle block rows, wherein the crown block row comprises a plurality of crown blocks and wherein the pair of middle block rows comprises a plurality of middle blocks;
each of the plurality of middle blocks comprising a ground contact surface having a barrel type hexagonal shape that protrudes axially outwardly in a block width direction to form a pair of axially spaced first and second peak portions of the middle block,
the ground contact surface of each of the plurality of middle blocks comprising
a first long edge extending from the first peak portion toward a first side in the tire circumferential direction,
a first short edge being shorter than the first long edge and extending from the first peak portion toward a second side in the tire circumferential direction,
a second long edge extending from the second peak portion toward the first side in the tire circumferential direction, and
a second short edge being shorter than the second long edge and extending from the second peak portion toward the second side in the tire circumferential direction, wherein
a ratio L5/L6 between a circumferential length L5 of the first long edge and a circumferential length L6 of the first short edge is equal to or less than 1.15, and
a ratio L7/L8 between a circumferential length L7 of the second long edge and a circumferential length L8 of the second short edge is equal to or less than 1.15,
each of the plurality of crown blocks and the plurality of middle blocks being provided with a single full-opened sipe traversing a respective one of the plurality of crown blocks and the plurality of middle blocks axially completely; and
the full-opened sipe extending in a sipe longitudinal direction to form a zigzag opening configuration on a ground contact surface of a respective one of the plurality of crown blocks and the plurality of middle blocks, the sipe extending inwardly in a tire radial direction such that the zigzag opening configuration oscillates in the sipe longitudinal direction repeatedly with a total amplitude and a wavelength while maintaining the zigzag opening configuration,
wherein a half of the wavelength is in a range of from 0.10 to 0.24 times a maximum depth of the sipe, and
wherein a slope of the half of the wavelength with respect to the total amplitude has an angle in a range of from 45 to 65 degrees.

2. The heavy-duty tire according to claim 1, wherein the sipe is provided such that the sipe longitudinal direction is in a range of from 5 to 15 degrees with respect to a tire axial direction.

3. The heavy-duty tire according to claim 1, wherein
in each middle block, the sipe comprises a first end and a second end each of which is located proximately to either one of the first and second peak portions.

4. The heavy-duty tire according to claim 3, wherein
the first end of the sipe is in communication with the first peak portion or is located within 2 mm in the tire circumferential direction from the first peak portion, and
the second end of the sipe is in communication with the second long edge at a location which is away from the second peak portion greater than 2 mm but within 5 mm in the tire circumferential direction.

5. The heavy-duty tire according to claim 1, wherein the plurality of crown blocks and the plurality of middle blocks each have a maximum width in a tire axial direction in a range of from 15% to 25% of a tread width.

6. The heavy-duty tire according to claim 1, wherein each of the plurality of crown blocks and the plurality of middle blocks is provided with only the sipe.

7. The heavy-duty tire according to claim 1, wherein
the plurality of lateral grooves comprises a plurality of crown lateral grooves and a plurality of middle lateral grooves each of which is provided with groove-bottom sipes, and
the groove-bottom sipes extend in a straight manner in a tire radial direction as well as a sipe longitudinal direction thereof.

8. The heavy-duty tire according to claim 1, wherein
each of the plurality of crown blocks comprises a ground contact surface having a barrel type hexagonal shape that protrudes axially outwardly in a block width direction to form a pair of axially spaced first and second peak portions of the crown block, and
the ground contact surface of each of the plurality of crown blocks comprises
a first long edge extending from the first peak portion toward a first side in the tire circumferential direction,
a first short edge being shorter than the first long edge of the crown block and extending from the first peak portion toward a second side in the tire circumferential direction,
a second short edge extending from the second peak portion toward the first side in the tire circumferential direction, and
a second long edge being longer than the second short edge of the crown block and extending from the second peak portion toward the second side in the tire circumferential direction, wherein
a ratio L1/L2 between a circumferential length L1 of the first long edge and a circumferential length L2 of the first short edge is equal to or less than 1.15, and
a ratio L3/L4 between a circumferential length L3 of the second long edge and a circumferential length L4 of the second short edge is equal to or less than 1.15.

9. The heavy-duty tire according to claim 1, wherein
the four main grooves comprise a pair of crown main grooves and a pair of shoulder main grooves arranged axially outside the pair of crown main grooves,
the plurality of lateral grooves comprises a plurality of crown lateral grooves extending between the crown main grooves to form the crown blocks, a plurality of middle lateral grooves extending between the crown main grooves and the shoulder main grooves to form the middle blocks, and a plurality of shoulder lateral grooves extending axially outwardly from the shoulder main grooves to form the shoulder block rows, a depth of the crown lateral grooves and the middle lateral grooves is in a range of from 60% to 90% of a depth of the crown main grooves, and a depth of the shoulder lateral grooves is in a range of from 10% to 40% of a depth of the shoulder main grooves.

10. The heavy-duty tire according to claim 9, wherein a groove width W4 of the middle lateral grooves is greater than a groove width W3 of the crown lateral grooves.

11. The heavy-duty tire according to claim 10, wherein the groove width W3 of the crown lateral grooves is in a range of from 15% to 25% of circumferential arrangement pitches Pc of the crown blocks, and the groove width W4 of the middle lateral grooves is in a range of from 16% to 26% of circumferential arrangement pitches Pm of the middle blocks.

12. The heavy-duty tire according to claim 1, wherein the four main grooves comprise a pair of crown main grooves, the plurality of lateral grooves comprises a plurality of crown lateral grooves extending between the crown main grooves to form the crown blocks, the plurality of crown lateral grooves is provided with a plurality of groove-bottom sipes, and the plurality of groove-bottom sipes of the crown lateral grooves extends such that both ends thereof are communicated with the pair of crown main grooves.

13. The heavy-duty tire according to claim 12, wherein the four main grooves comprise a pair of shoulder main grooves, the plurality of lateral grooves comprises a plurality of middle lateral grooves extending between the crown main grooves and the shoulder main grooves form the middle blocks, the plurality of middle lateral grooves is provided with a plurality of groove-bottom sipes, and the plurality of groove-bottom sipes of the middle lateral grooves extends such that both ends thereof are communicated with the crown main grooves and the shoulder main grooves which are axially adjacent.

* * * * *